United States Patent
Jacobs et al.

[19]

[11] Patent Number: 5,871,193
[45] Date of Patent: Feb. 16, 1999

[54] FLAME RESISTANT, NON-CONDUCTIVE HANGER

[76] Inventors: William J. B. Jacobs; Tanya S. Jacobs; Mark W. Jacobs, all of P.O. Box 429, Sylvester, W. Va. 25193

[21] Appl. No.: 845,361

[22] Filed: Apr. 24, 1997

[51] Int. Cl.⁶ .................................................... F16L 3/00
[52] U.S. Cl. ........................ 248/317; 24/16 PB; D8/372; 248/53
[58] Field of Search ............................ 248/53, 317, 309; 24/16 PB, 300, 713.8; D8/367, 370, 372

[56] References Cited

U.S. PATENT DOCUMENTS

| | | |
|---|---|---|
| D. 303,212 | 9/1989 | Crowle . |
| D. 303,493 | 9/1989 | Jacobs . |
| 702,858 | 6/1902 | Hendricks et al. ........................ 182/6 |
| 907,076 | 12/1908 | Medart .................................... 248/343 |
| 1,775,736 | 9/1930 | Rose ........................................... 182/6 |
| 2,166,809 | 7/1939 | Frankel ...................................... 182/6 |
| 3,686,848 | 8/1972 | Miller, et al. . |
| 3,690,057 | 9/1972 | Norris . |
| 3,738,958 | 6/1973 | Paul, III . |
| 3,949,451 | 4/1976 | Bunn . |
| 4,257,221 | 3/1981 | Feinberg . |
| 4,534,262 | 8/1985 | Swenson . |
| 4,930,194 | 6/1990 | Frechin . |
| 5,116,681 | 5/1992 | Lin . |
| 5,130,069 | 7/1992 | Tietz et al. . |
| 5,329,728 | 7/1994 | Ray . |
| 5,521,003 | 5/1996 | Lo et al. . |

Primary Examiner—Ramon O. Ramirez
Assistant Examiner—Long Dinh Phan
Attorney, Agent, or Firm—Richard C. Litman

[57] ABSTRACT

A hanger loop of rope material provides for the suspension of innumerable articles in various industries, but is particularly well suited for use in underground mining, where it may be used to support electrical cables, pneumatic and hydraulic lines, air ventilation ducts, etc., above the floor of the mine drift. The hanger loop is preferably formed of a braided synthetic fiber which has been treated to provide flame retardant properties and which is also electrically non-conductive. Treated, braided polypropylene is a suitable material for the present rope loop. The closed loop is formed by passing the first end of the rope diametrically through its opposite end portion, and then coaxially through that same portion to secure the first end therein and to form a smaller closed loop. The second end is then inserted coaxially into the body of the main loop to secure the second end within the body of the main loop. This construction results in a braided rope loop in which the interconnected portions are pulled more tightly and securely together when tension is applied to the loop, thus producing a more secure loop which cannot slip when tension is applied. One or more article supports (S-hooks, snap hooks, etc.) may be installed on the loop at the time of manufacture, or later as desired and according to the type of support. The hanger loop may also be provided with bright, contrasting colors for better visibility in areas of low light, as in the mining environment.

20 Claims, 6 Drawing Sheets

FLAME RESISTANT, NON-CONDUCTIVE HANGER

BACKGROUND OF THE INVENTION

1. Field of the Invention

The present invention relates generally to article supports, hooks, loops, and etc., and more particularly to a closed loop which is formed of a length of preferably flame resistant and electrically non-conductive flexible material. The loop is used to support and suspend articles such as electrical cables, pneumatic and hydraulic lines, ventilation ducts, etc. in the mining industry, and has further applications in many other industries such as suspending parts being painted from an overhead conveyor system, as well as other applications where good strength and resistance to flame and industrial chemicals is required.

2. Description of the Related Art

Many industries require some means of temporarily supporting or suspending various articles for various purposes, and often have need of a simple yet durable strap or loop which may be used as a hanger for various parts and components. Accordingly, various such devices have been developed in the past, but all have had one or more deficiencies which have rendered them unsuitable for use in demanding industries such as underground mining, where flame resistance, electrical non-conductivity, resistance to chemicals, and good strength, durability, and reliability are absolutely required.

In the past, the various devices manufactured for such purposes have not included all of the above properties, and moreover were not necessarily formed of highly visible materials providing for ease of visibility in darkened areas such as mines land the like. Moreover, such hanger loops, when formed of twisted or braided rope material, were often closed using means which were prone to slippage or damage, thus allowing the loop to open and release any articles being supported thereby. The present hanger responds to each of the above problems and deficiencies by using a suitable material, and forming a closed loop using that material, which is completely resistant to opening when strain is placed upon the loop. A discussion of the related art of which the inventors are aware, and its differences and distinctions from the present invention, is provided below.

U.S. Pat. No. 3,686,848 issued on Aug. 29, 1972 to Robert Miller et al. describes a Highly Resilient Polypropylene Yarn which is particularly suited for carpeting and upholstery. No mention is made of the flame resistance or other industrially desirable properties of the material, and no disclosure is made of any specific rope or loop construction using the Miller et al. yarn.

U.S. Pat. No. 3,690,057 issued on Sep. 12, 1972 to Alan H. Norris describes Anti-Static Yarn And Fabrics wherein at least some of the yarn filaments are coated with a film including an electrically conductive metal. This teaches away from the material of the present invention, which is preferably electrically non-conductive.

U.S. Pat. No. 3,738,958 issued on Jun. 12, 1973 to Henry N. Paul 3rd describes a Synergistic Flame Retarding Composition For Polypropylene Of 1, 2, 3, 4, 5-Pentabromo-6-Chlorocyclohexane, Tetrabromophthalic Anhydride And Antimony Trioxide. While the present invention may utilize polypropylene rope material treated with the above or similar flame retardant chemicals, the Paul 3rd disclosure is silent regarding the application of the chemicals to fiber materials other than carpeting or the like. No disclosure is made of the formation of closed hanger loops using polypropylene rope material, as provided by the present invention.

U.S. Pat. No. 3,949,451 issued on Apr. 13, 2976 to Hugh Bunn describes a Safety Hook Snap Assembly comprising a spring loaded closure which serves to close two areas of the device simultaneously. While the present hanger may utilize such a device, as well as other snap hock, D-ring, etc. devices, Bunn does not disclose any form of closed rope loop to which his device may attach.

U.S. Pat. No. 4,257,221 issued on Mar. 24, 1981 to Arthur L. Feinberg describes a Fire Resistant Fiber Blend wherein a fire resistant yarn is woven with a polyester or other yarn material. While the resultant material may be suitable for use in clothing, it is not suitable for the production of rope and other elongate materials requiring high tensile strength, as in the present rope hangers. Moreover, Feinberg is silent regarding the formation of his yarns into rope, or a rope hanger according to the present invention.

U.S. Pat. No. 4,534,262 issued on Aug. 13, 1985 to Richard C. Swenson describes a Safety Mooring Line comprising an outer wrap of Nylon (tm) and two concentric inner lines of Kevlar (tm). The inner Kevlar core is formed to provide supplementary strength if the outer Nylon load bearing component breaks. No particular formation of a rope hanger loop is disclosed by Swenson.

U.S. Pat. No. 4,930,194 issued on Jun. 5, 1990 to Jean P. Frechin describes a Snap Hook For Use In Climbing, Pot Holing Or Similar Activities. The device comprises a D-ring with a specially formed connecting end between the hinged link and its adjacent ring member when the ring is closed. While the present rope loop may make use of the Frechin device, Frechin does not disclose any rope or other line or loop to which his device may be secured.

U.S. Pat. No. 5,116,681 issued on May 26, 1992 to Perry H. Lin describes Anti-Static Yarns Containing Polystyrene. The material includes a polypropylene or other material which is blended with electrically conductive carbon. This teaches away from the present, preferably electrically non-conductive material from which the present rope hanger loop is formed.

U.S. Pat. No. 5,130,069 issued on Jul. 14, 1992 to Raymond F. Tietz et al. describes a Process For Producing Dyeable Hot-Bulked Polypropylene Fibers Modified Wlth A Copolyamide. While the present invention preferably utilizes a polypropylene material and may include strands of specific color(s), Tietz et al. are silent regarding the use of their fibers in forming a closed loop hanger, as provided by the present invention.

U.S. Pat. No. 5,329,728 issued on Jul. 19, 1994 to Glenn A. Ray describes a Plant Pot Hanger comprising an open metal clip adapted to secure to the edge of a hanging plant pot or drain saucer for such a pot. The device is not suited for use with the present invention, nor is any closed rope loop disclosed in the Ray patent.

U.S. Pat. No. 5,521,003 issued on May 28, 1996 to Ying-Cheng Lo et al. describes a Flame Retardant Composition comprising a blend of polypropylene with ethylene and propylene. No fibers produced from the material are disclosed, nor is any form of rope, or any means of forming a closed loop from such rope, disclosed.

U.S. Pat. No. D-303,212 issued on Sep. 5, 1989 to William G. Crowle illustrates a design for an Interlocking Snap-Hook Unit, comprising two interlinked flat components. No closed rope hanger loop is disclosed, and no means is disclosed to secure the unit to another article.

U.S. Pat. No. D-303,493 issued on Sep. 19, 1989 to William J. B. Jacobs illustrates a design for a Hanger Unit For Cable Or Similar Articles, comprising a closed rope loop having an S-hook depending therefrom. While the external appearance of the design is similar to the appearance of the present hanger invention, the Jacobs design patent does not disclose any means of forming such a loop, nor is any disclosure made of the materials, flame retardation, electrical conductivity, or coloring of the device, each of which properties are provided for in the present invention.

In addition to the above patent publications, the inventors are aware of several products which have been manufactured for the mining industry, and particularly for the coal mining industry in West Virginia, to perform essentially the same function as the present invention. Elk Sales & Service Co., Southern Safety Sign & Manufacturing Co., and Shawnee Hills of Danville, W.Va., each produce a braided polypropylene loop in which the two ends are each spliced into the opposite hollow core to form a closed loop. No knotting of any of the strands of the rope about other strands, is apparent, while such knotting is used in combination with an interweaving of the two rope ends in the present rope loop hanger invention.

Adams Distributors, McJunkin Corporation, and Mine Cable Service Co. each manufacture a rope loop of twisted (not braided) material, with the two ends being crimped together using a hog ring, split washer, or similar metal attachment. And finally, Bailey Brothers produces a braided rope loop in which an S-hook is an integral part of the closure, with the two ends of the loop each being passed around the body of the hook and inserted back into the hollow core of the braided material. The two ends thus formed are only connected by the S-hook, and do not connect directly together, as in the knotted and interwoven ends of the present rope hanger loop of the present invention.

None of the above inventions and patents, taken either singly or in combination, is seen to describe the instant invention as claimed.

SUMMARY OF THE INVENTION

The present invention comprises a closed loop of rope or flexible stranded material, which is used as a hanger for various articles in a variety of different industries. The closed loop is formed by passing the first end of the rope diametrically through its opposite end portion, and then coaxially through that same portion to secure the first end therein and to form a smaller closed loop. The second end is then inserted coaxially into the body of the main loop to secure the second end within the body of the main loop. This construction results in a braided rope loop in which the interconnected portions are pulled more tightly and securely together when tension is applied to the loop, thus producing a more secure loop which cannot slip when tension is applied.

One or more supports in the form of S-hooks, snap hooks, clips, D-rings, etc., may be removably clipped to the hanger or installed thereon during its assembly as desired. The present hanger is particularly well suited for use in underground mining for the suspension of electrical cables, pneumatic and hydraulic lines, ventilation ducts, etc. from the roof or along the walls of a drift, in order to support them well above the floor. However, the versatility of the present hanger provides a broad range of uses, such as the suspension of articles from an overhead conveyor for painting or other processing, support of ancillary equipment such as fire extinguishers and the like, safety lines, etc.

The material of which the present hanger is formed is preferably an electrically non-conductive and flame resistant synthetic fiber, with a flame retardant treated braided polypropylene being preferred. The polypropylene rope is preferably a bright color, such as yellow, in order to stand out visually in darkened environments. At least one strand of the multiple stranded braided rope may be of a contrasting color, such as a bright orange, for further visual distinction.

Accordingly, it is a principal object of the invention to provide an improved hanger which is formed as a closed loop of rope by knotting, looping, and interweaving the two ends of the rope piece together to form a closed loop which is incapable of slipping when tension is applied thereto.

It is another object of the invention to provide an improved hanger loop which is preferably formed of braided synthetic fibers of electrically non-conductive and flame resistant material, such as a braided polypropylene rope or line which has been treated to have a flame resistant property.

It is a further object of the invention to provide an improved hanger loop which is highly visible and which is formed of a bright color, and which may also include at least one strand of a contrasting bright color as desired.

An additional object of the invention is to provide an improved hanger loop which may include one or more article supports thereon as desired, installed either at the time of manufacture or after the loop has been formed.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
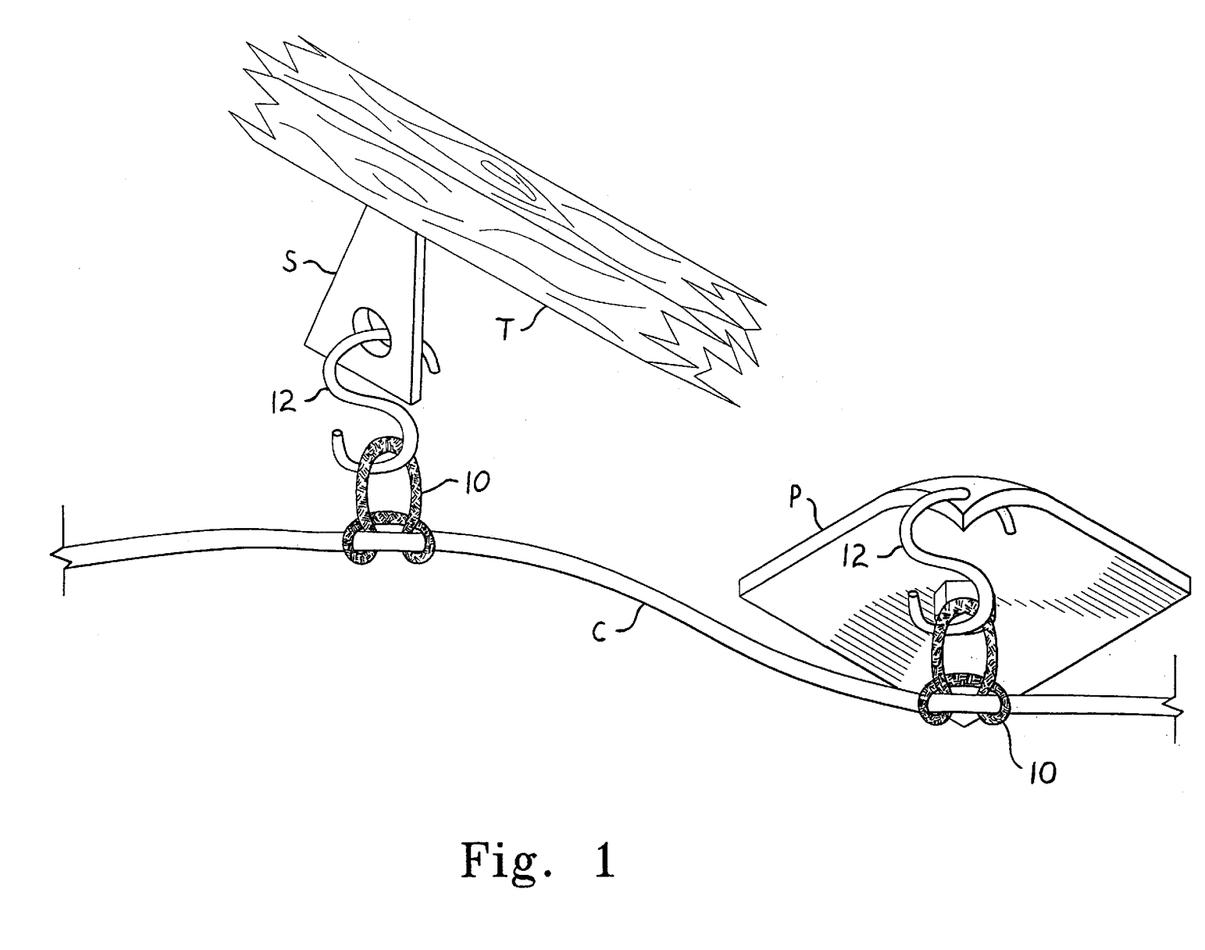
FIG. 1 is an environmental perspective view of a plurality of the present hanger loops suspended from the roof of a mine drift or the like by S-hooks, with a cable or the like suspended from the loops by passing the present loops about the cable.

The present invention comprises a rope hanger for use in temporarily suspending various articles, with examples of the present hangers and their function being shown in FIG. 1. The hangers 10 are well suited for use in the underground mining industry, as shown in FIG. 1, for suspendibly supporting articles such as electrical cables C, hydraulic and pneumatic lines, ventilation ducts, etc. from the roof R or along the wall of a mine drift to keep such articles clear of the drift floor. The hangers 10 may be suspended by S-hooks 12 or other suitable article attachment means as discussed below, with the S-hooks 12 or other means in turn being removably secured to a conventional spike S imbedded in a mine timber T, or hooked to the corner of a conventional roof plate P, as shown, or otherwise suspended.

Preferably, each of the present hanger loops 10 is formed to have a diameter on the order of six inches or so when laid out in a circular configuration, in order to position any articles suspended therefrom well away from the opposite side of the loops 10 which may be connected to a metal object. This precludes any arcing of electrical energy between the article suspended within the loops 10, such as the cable C, and a grounded potential. It should be understood that the loops 10 shown in FIG. 1 are smaller than scale, as the intent of FIG. 1 is to show the environment and use of the present hanger loops 10. However, the present hanger loops 10 may be formed of virtually any diameter material, and in virtually any size desired.

Figure 2:
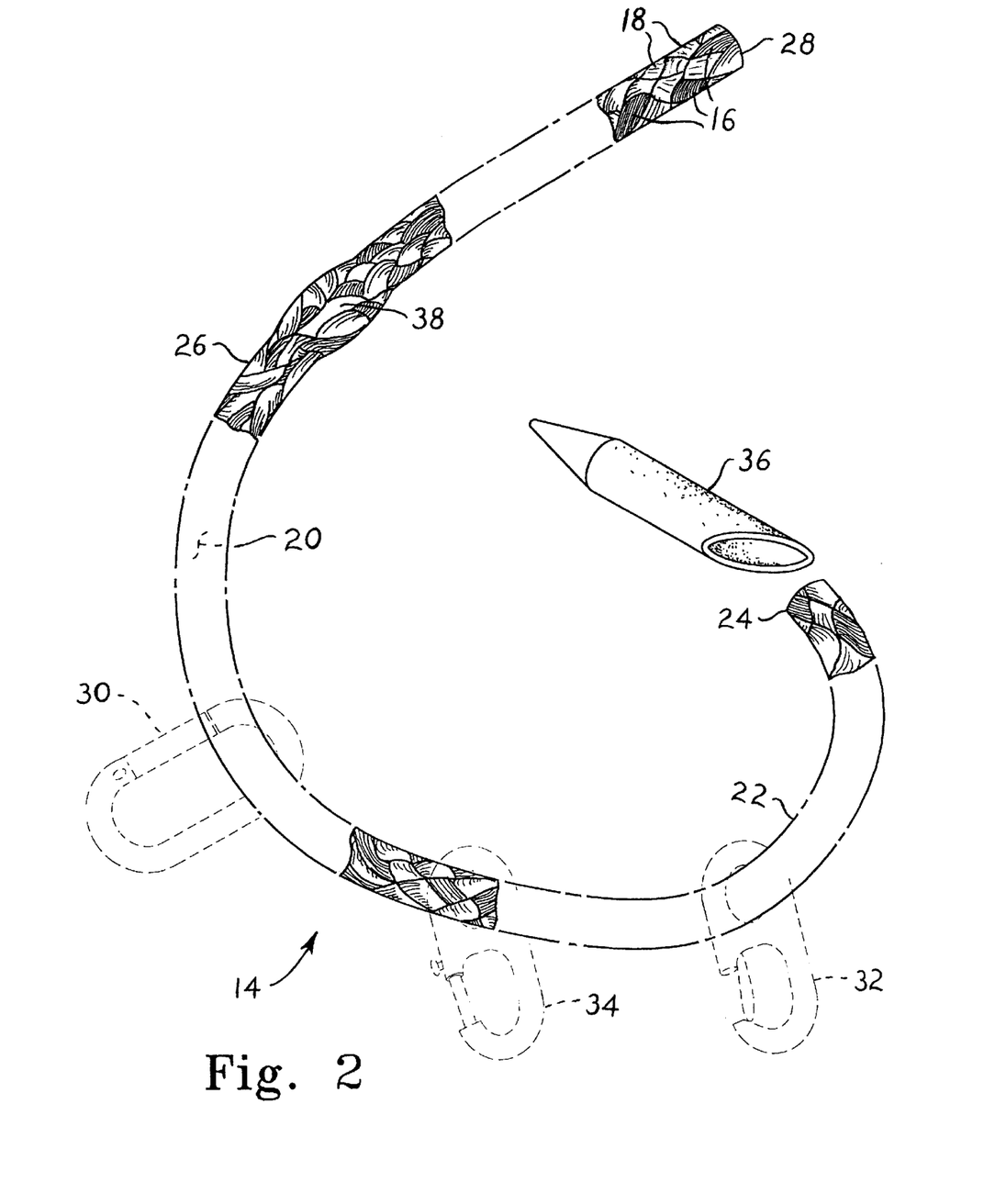
FIG. 2 is a perspective view of the first stage of the formation of the present hanger loop, with a plurality of optionally installed article supports being shown in broken lines.

Each of the hangers 10 is formed of a length of hollow core, braided fiber rope 14, an example of which is shown in FIG. 2. Such braided hollow core rope is formed of a plurality of diagonally interwoven strands, with each of the strands being formed of a plurality of individual fibers. An equal number of first diagonal direction strands 16 and opposite second diagonal direction strands 18, are alternatingly interwoven over and under one another to provide a rope having a hollow core 20. The rope length 14 includes a first connecting portion 22 with a first end 24 extending therefrom, and an opposite second connecting portion 26 with a second end 28 extending therefrom. These connecting portions and ends 22 through 28 are worked through the diagonal strands of one another to produce the completed closed loop 10.

Before forming the present closed hanger loop 10, it should be understood that while the loop 10 may be disassembled to open the hanger, the hanger loop 10 normally remains permanently closed with its two connecting portions and ends 22 through 28 being permanently spliced together. While an openable article support, such as the D-ring 30 shown in broken lines in FIG. 2, may be attached or removed from the closed loop 10 at any time, other types of supports having permanently closed loops, such as the leaf spring hook 32 and/or the snap hook 34 with its spring loaded pin, must be installed along the rope length 14 before the two connecting portions and ends 22 through 28 are spliced together. One or more of the above devices, or other attachments, may be secured to the rope length 14 and/or completed loop 10, as desired.

The first step in forming the present hanger loop is to place a fid (splicing tool) 36 over the first end 24 of the rope length 14, and to use the point of the fid 36 to separate two adjacent first and second strands 16 and 18 and form an eye or passage diametrically completely through the second connecting portion 26 at a first point 38 of the rope 14. The fid 36, with the first end 24 inserted therein and the first connecting portion 22 extending therefrom, is worked diametrically completely through passage at the first point 38 through the second connecting portion 26 of the rope 14, drawing the first end 24 and first connecting portion 22 of the rope length 14 through the eye. The amount of rope drawn through will depend upon the rope diameter and other factors, but will be on the order of five inches for quarter inch diameter rope.

Figure 3:
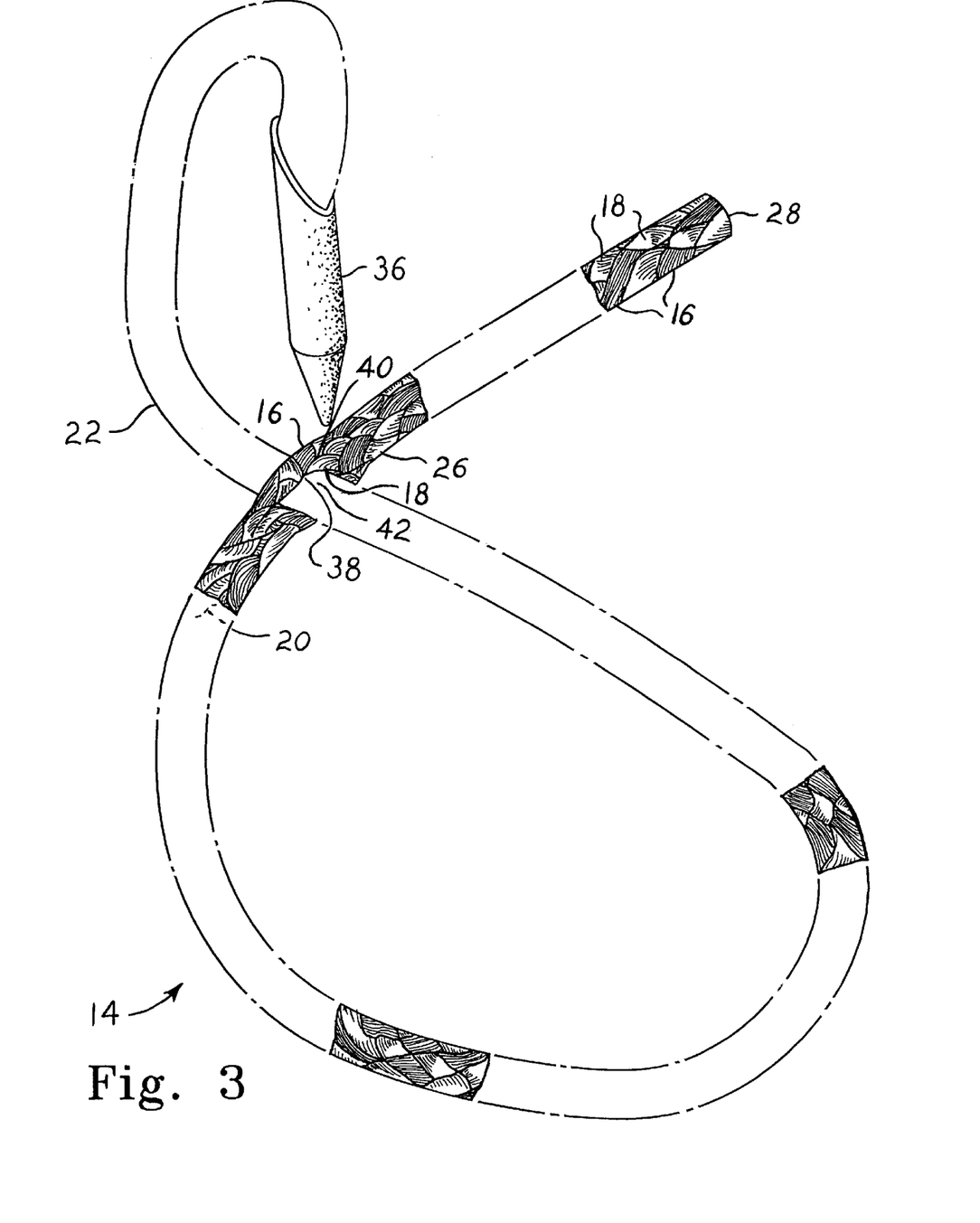
FIG. 3 is a perspective view of the second stage of the formation of the present hanger loop.

The above described step will be similar to the rope length 14 of FIG. 3, when completed. The fid 36, with the first connecting portion 22 extending therefrom, is then doubled back to the second connecting portion 26 of the rope length 14, and the point of the fid 36 used to separate adjacent first and second strands 16 and 18 to form a second eye or point 40 in the second connecting portion 26 of the rope length 14. The fid 36 point is then inserted through the second eye 40, diametrically through the intersecting portion 42 of the first connecting portion 22 within the hollow core 20 of the second connecting portion 26, and then worked concentrically through the hollow core 20 of the second connecting portion 26 to conceal the first end 24 within the hollow core 20 of the second connecting portion 26, as shown completed in FIG. 4.

Figure 4:
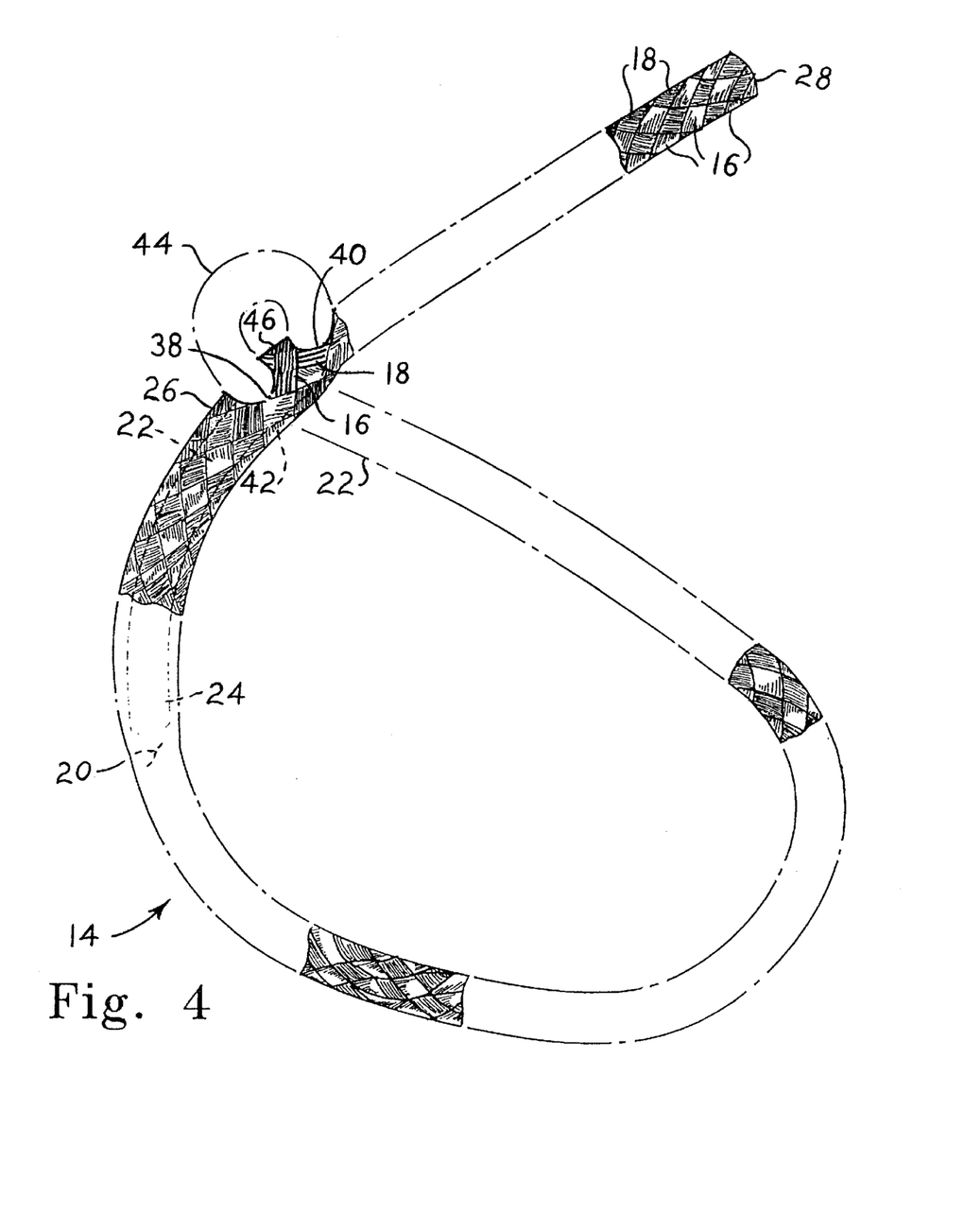
FIG. 4 is a perspective view of the completion of the second stage of formation shown in FIG. 3.

The first connecting portion 22 adjacent the fid 36 is then held within the hollow core 20 and the fid 36 is worked out of the hollow core 20, between adjacent strands 16 and 18, and removed from the first end 24 of the rope 14. The first end 24, with the immediately adjacent portion (i.e., a few inches) of the first connecting portion 22, is thus concealed and secured within the hollow core 20 of the remainder of the connecting portion 22, as shown in FIG. 4. A small loop, eye, or knot 44 will remain extended from the surface of the second connecting portion 26 of the rope 14, as described further below, which way be worked and shortened as desired to form a small nub along the rope surface.

The first and second points of penetration 38 and 40 of the second connecting portion 26, are not precisely at the same point. However, they are very closely adjacent to one another, preferably being separated by only a single first strand 16 and second strand 18, where the first strand 16 crosses the second strand 18 to form an "X" configuration 46 of the two strands 16 and 18 between the two penetration points 38 and 40 of the second connecting portion 26. Thus, as the small loop or eye 44 formed in first connecting portion 22 by its diametric passage through and then concentric passage into the second connecting portion 26, is pulled taut, it is precluded from slipping completely into the hollow interior 20 of rope 14 due to its external passage about the crossed strands 16 and 18 at the "X" point 44 between the two penetration points 38 and 40 of the second connecting portion 26. The configuration of the partially completed hanger to this stage is shown in FIG. 4.

Figure 5:
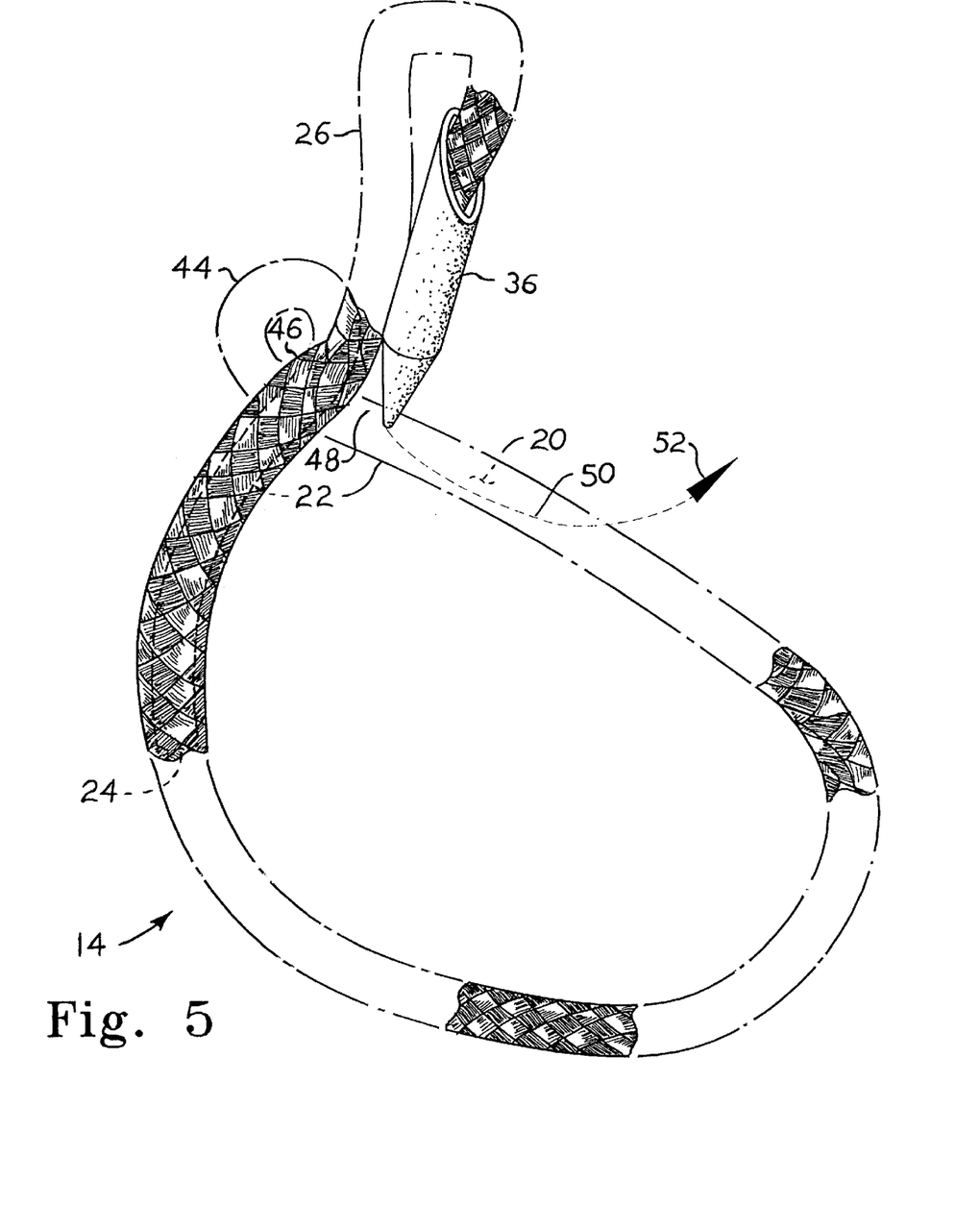
FIG. 5 is a perspective view of the third stage of the formation of the loop.

The final step in the hanger formation process is shown in FIG. 5. Here, the fid 36 has been transferred to the opposite second end 28 of the rope length 14, for working back into the hollow core 20 within the first connecting portion 22 of the rope 14. The point of the fid 36 is inserted between the strands 16 and 18 at a second connecting portion entrance point 48 along the first connecting portion 22, at or as close as possible to the intersection of the first connecting portion 22 and its passage through the second connecting portion 26.

Figure 6:
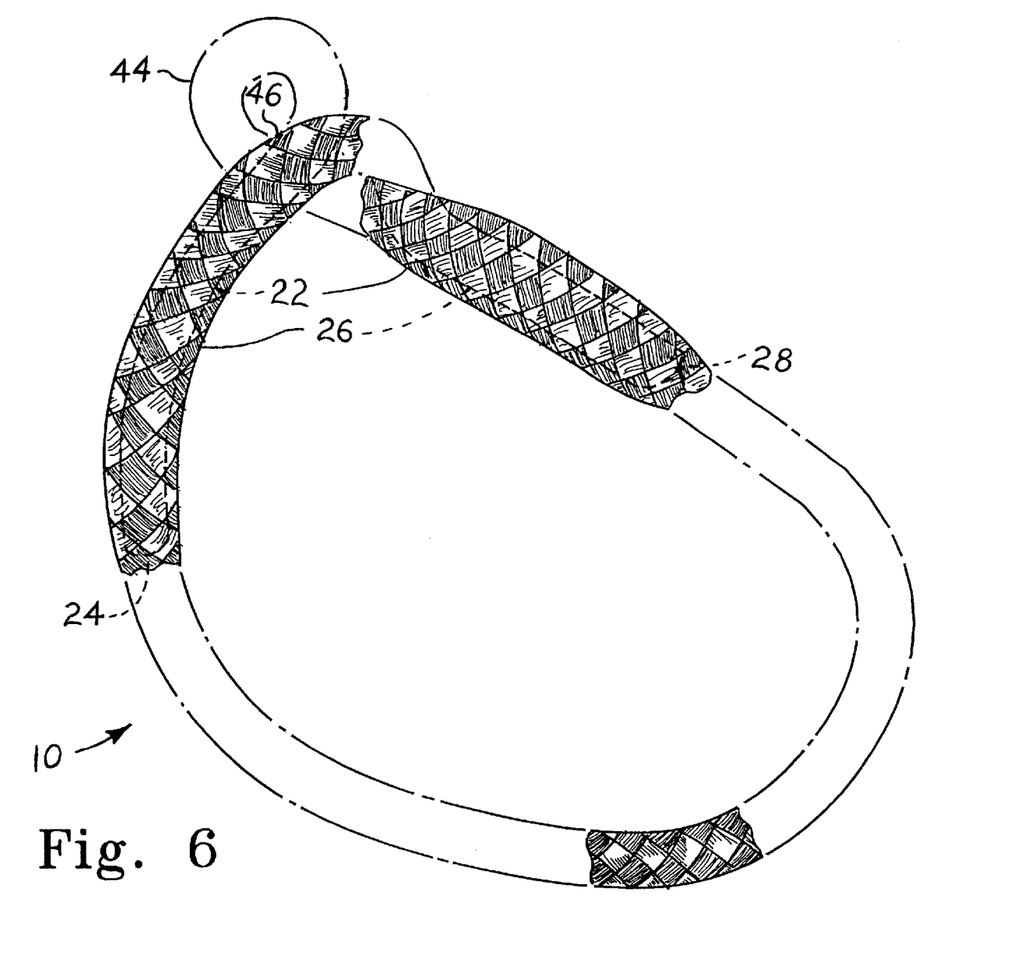
FIG. 6 is a perspective view of the completed third stage and completed loop formed in accordance with the above stages.

The fid 36, and its attached second end 28 secured therein, are then worked concentrically through the hollow core 20 within the first connecting portion 22 of the rope 14, as shown by the broken directional arrow 50 in FIG. 5. The portion of the second connecting portion 26 which is immediately adjacent the fid 36, and captured concentrically within the hollow core 20 of the first connecting portion 22, may then be held within the first connecting portion 22 by gripping the outer weave of the first connecting portion 22 to hold the second connecting portion 26 therein, and the fid 36 worked outward from the hollow core 20 between adjacent strands 16 and 18, as indicated by the arrowhead 52. The last few inches of the second end 28 and its adjacent second connecting portion 26 are thus completely concealed within the hollow core 20 of the opposite first connecting portion 22, as shown in the completed closed hanger loop 10 of FIG. 6.

The above hanger loop 10 construction provides a significant increase in strength over other such loops of the related art, in that the novel weaving of the first end 24 and connecting portion 22 diametrically through the opposite second connecting portion 26 at a first point 38, and thence back into the second connecting portion 26 at a separate second point 40 and back to pass through itself within the second connecting portion 26, provides a locking interweave of strands 46 about which the first connecting portion knot or eye 44 is formed, which preclude the pulling of the first connecting portion 22 from the second connecting portion 26 into which it has been concentrically worked.

With other hangers in which the two opposite ends have been interwoven into their opposite hollow rope members, continual tension, particularly if variable as loads are increased and reduced, can cause the two ends to work loose from their opposite rope portions in which they are captured, as they pass more or less straight into one another and do not form a capture loop about a crossed pair of strands, as provided in the present hanger loop 10. Thus, the greater the tensile force applied to the present loop 10, the tighter the eye or knot 44 will tend to be pulled about the crossed strands 46 captured therein, thus preventing the accidental disassembly of the present hanger loop 10 and providing an even tighter and stronger assembly.

The above described hanger loop 10, and its construction, may be formed using virtually any size and material of braided, hollow core rope or the like, whether of natural or synthetic fibers. However, synthetic fiber material is preferred, due to its greater fire resistance, resistance to deterioration due to chemicals, and resistance to breakdown caused by microorganisms. A braided polypropylene rope has been found to provide excellent characteristics for use in the construction of the present hangers 10. If additional flame or fire resistance is desired, the polypropylene material may be treated with a flame retardant chemical, such as the chemical compound of U.S. Pat. No. 3,738,958 to Henry N. Paul 3rd, discussed in the Description of the Related Art further above. Other suitable chemical treatments providing flame resistance may also be used.

It will be seen that the use of an essentially pure, non-metallic fiber such as polypropylene, also provides an electrically non-conductive hanger due to the electrically insulating properties of such materials, particularly synthetic plastic materials. This provides important safety benefits when the present hangers 10 are used for the support of electrical equipment, such as electrical cables, etc. in various environments. Accordingly, the various types of snap hooks, D-rings, etc. which may be installed upon the present hanger loops 10 during or after their construction, are preferably formed of materials which are not prone to producing sparks when struck by another object, e.g., non-metallic or bronze materials.

While the present rope loop hangers 10 are well suited for use in providing temporary support for innumerable different articles in a vast variety of environments, they are particularly well suited for use in the underground mining industry, due to their flame retardant and electrically non-conductive properties. The present hangers 10 may be formed using rope having a relatively bright color or colors, in order to provide optimum visibility in the normally relatively dark conditions found in underground mines. Such polypropylene rope material is readily available in such bright colors as yellow, but it has been found that the yellow color may be insufficient in conditions within a mine, as it may become obscured due to lighter colors of dust or other materials.

However, the present hangers 10 are preferably formed of hollow core braided material having at least one strand of a contrasting bright color, such as a bright international orange, indicated by the heavier contrasting shading of the first strands 16 in FIGS. 2 and 3 of the drawings. It has been found that even in the event that the bright yellow primary coloring of the present hangers 10 becomes obscured, the bright orange contrasting color of at least one of the multiple braided strands, provides a significant improvement in visibility for the present hangers 10 and causes them to stand out distinctly against most backgrounds.

In summary, the present flame resistant, electrically non-conductive hanger provides a most useful means of temporarily suspending a variety of different articles in many different industries, such as underground mines, automobile assembly plants, shipyards, etc. The hangers provide a significant advance in security over other devices of the related art, which may slip or come apart under heavy loads. The present hangers may be formed using virtually any suitable diameter of rope, depending upon the strength required for the completed hanger. Hangers formed by the present invention provide weight bearing strength up to the ultimate tensile strength of the rope from which they are formed, without separating or breaking at the connection or splice between the two ends of the rope. The use of electrically non-conductive and flame resistant materials, as well as bright and contrasting colors in different strands of the hanger rope, provides hangers which are safe and durable in virtually any environment of use.

It is to be understood that the present invention is not limited to the sole embodiments described above, but encompasses any and all embodiments within the scope of the following claims.

We claim:

1. A hanger for temporarily suspending articles therefrom, comprising:

a length of hollow core braided fiber rope having a plurality of first diagonal direction strands alternatingly interwoven with a plurality of second diagonal direction strands, and a first connecting portion with a first end and an opposite second connecting portion with a second end;

said first connecting portion being positioned diametrically through said second connecting portion at a first point thereon and thence into said second connecting portion at a second point thereon, provided with a locking interweave of strands about which a first connecting portion knot is formed, then inserted diametrically through an intersecting portion of the first connecting portion within the hollow core of the second connecting portion and concentrically through said second connecting portion to be captured therein;

said second point being separated from said first point by at least one of said first direction strands and at least one of said second direction strands immediately adjacent said at least one of said first direction strands, with said at least one of said first direction stands crossing over said at least one of said second direction strands; and said second connecting portion passing into said first connecting portion at a second connecting portion entrance point thereon providing with a locking interweave of strands about which a first connecting portion knot is formed, then inserting diametrically through an intersecting portion of the first connecting portion within the hollow core of the second connecting portion and being captured concentrically within said first connecting portion to form a closed loop of increasing strength with increasing tensile force upon said closed loop.

2. The hanger according to claim 1, wherein said braided fiber rope is formed of polypropylene fibers treated with a flame retardant material.

3. The hanger according to claim 1, wherein the majority of said first diagonal direction strands and said second diagonal direction strands are a bright first color, with at least a portion of one of said diagonal direction strands being a bright second color contrasting with said first color.

4. The hanger according to claim 3, wherein said first color is yellow.

5. The hanger according to claim 3, wherein said second color is orange.

6. The hanger according to claim 1, including at least one article support installed thereon.

7. The hanger according to claim 6, wherein said at least one article support is an S-hook.

8. The hanger according to claim 6, wherein said at least one article support is a snap hook.

9. The hanger according to claim 6, wherein said at least one article support is a spring hook.

10. The hanger according to claim 6, wherein said at least one article support is a D-ring.

11. A method of forming a hanger for temporarily suspending articles therefrom, comprising the following steps:
(a) providing a length of hollow core braided fiber rope having a plurality of first diagonal direction strands alternatingly interwoven with a plurality of second diagonal direction strands, and a first connecting portion with a first end and an opposite second connecting portion with a second end;
(b) separating adjacent first and second diagonal direction strands at a first point on the second connecting portion;
(c) passing the first end portion diametrically through the second connecting portion at the first point thereon;
(d) separating adjacent first and second diagonal direction strands at a second point on the second connecting portion, with the first point being separated from the second point by at least one of the first direction strands and at least one of the second direction strands immediately adjacent the at least one of the first direction strands and with the at least one of the first direction stands crossing over the at least one of the second direction strands;
(e) passing the first end into the second connecting portion at the second point thereon and concentrically through the second connecting portion, and capturing the first end therein;

(f) inserting the second end into the first connecting portion at the point of penetration of the first end therethrough; and
(g) passing the second end concentrically through the first connecting portion and capturing the second connecting portion therein, thereby forming a closed loop of increasing strength with increasing tensile force upon the closed loop.

12. The method of forming a hanger according to claim 11, wherein the step of providing a length of hollow core braided fiber rope includes the steps of:
(a) forming the rope of polypropylene fibers; and
(b) treating the rope with a flame retardant material.

13. The method of forming a hanger according to claim 11, wherein the step of providing a length of hollow core braided fiber rope includes the steps of:
(a) coloring the majority of the first diagonal direction strands and second diagonal direction strands with a bright first color; and
(b) coloring at least a portion of one of the diagonal direction strands with a bright second color contrasting with the first color.

14. The method of forming a hanger according to claim 13, wherein the step of coloring the majority of the first diagonal direction strands comprises using yellow as the bright first color.

15. The method of forming a hanger according to claim 13, wherein the step of coloring at least a portion of one of the diagonal direction strands comprises using orange as the bright second color.

16. The method of forming a hanger according to claim 11, including the step of installing at least one article support thereon.

17. The method of forming a hanger according to claim 16, wherein the step of installing at least one article support comprises using an S-hook for said at least one article support.

18. The method of forming a hanger according to claim 16, wherein the step of installing at least one article support comprises using a snap hook for said at least one article support.

19. The method of forming a hanger according to claim 16, wherein the step of installing at least one article support comprises using a spring hook for said at least one article support.

20. The method of forming a hanger according to claim 16, wherein the step of installing at least one article support comprises using a D-ring for said at least one article support.

* * * * *